Nov. 5, 1935.  J. V. CARDEN  2,019,654
ENDLESS TRACK VEHICLE
Filed July 20, 1929  3 Sheets-Sheet 1
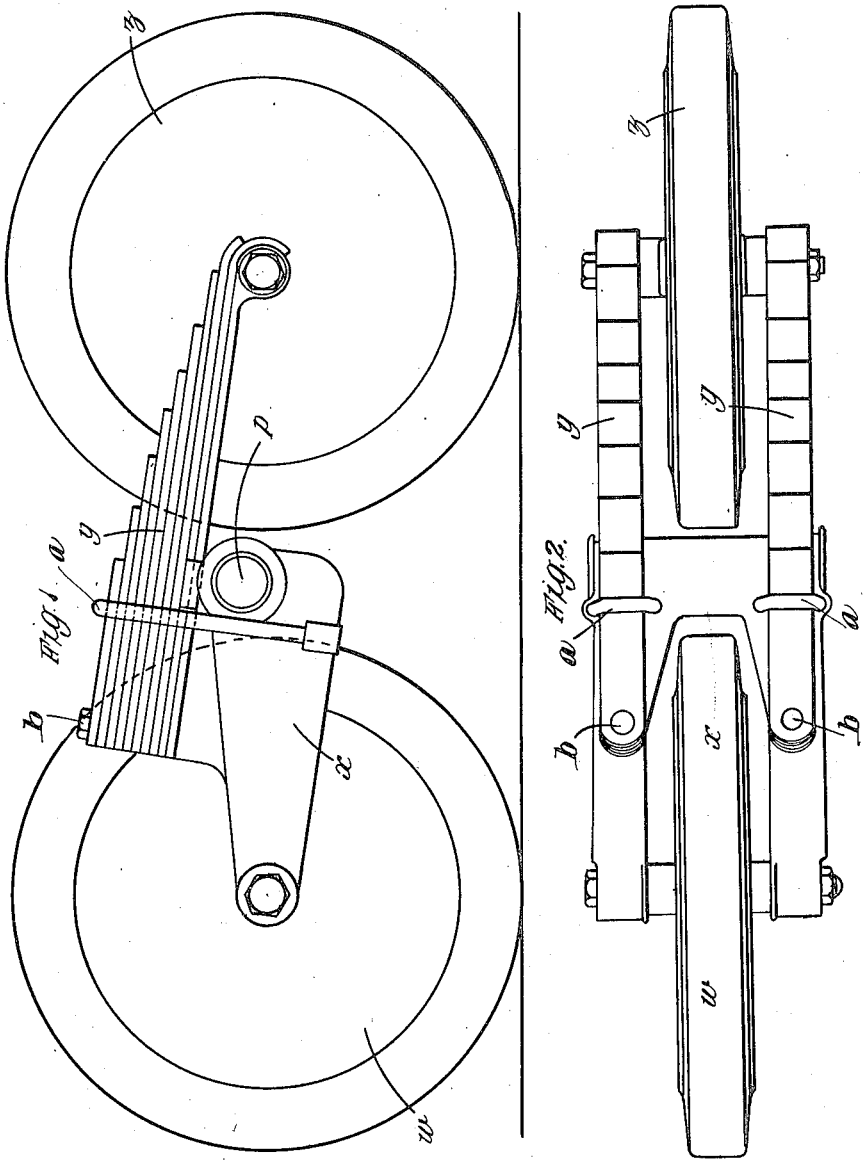

Nov. 5, 1935.　　　　J. V. CARDEN　　　　2,019,654
ENDLESS TRACK VEHICLE
Filed July 20, 1929　　　3 Sheets-Sheet 2
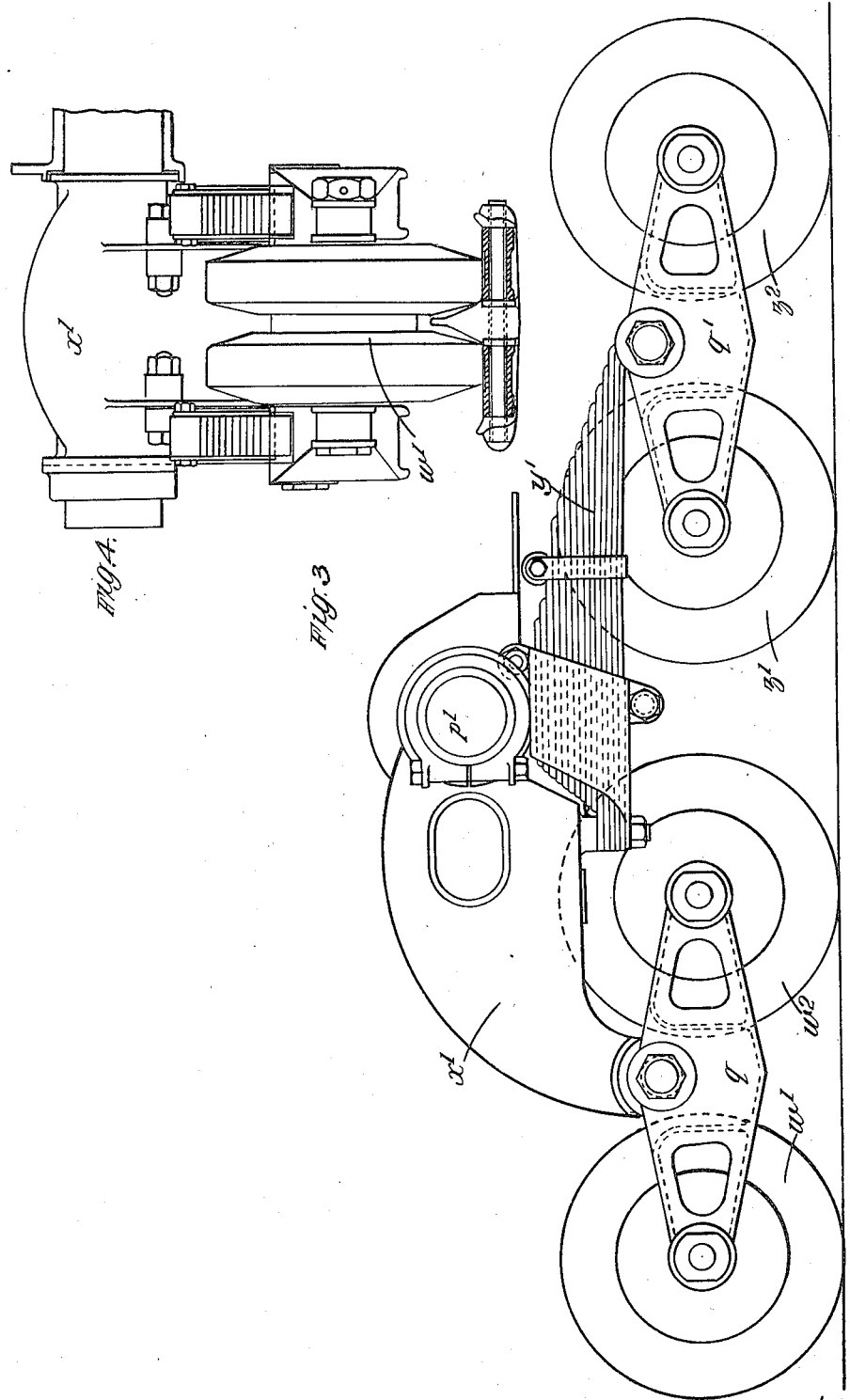

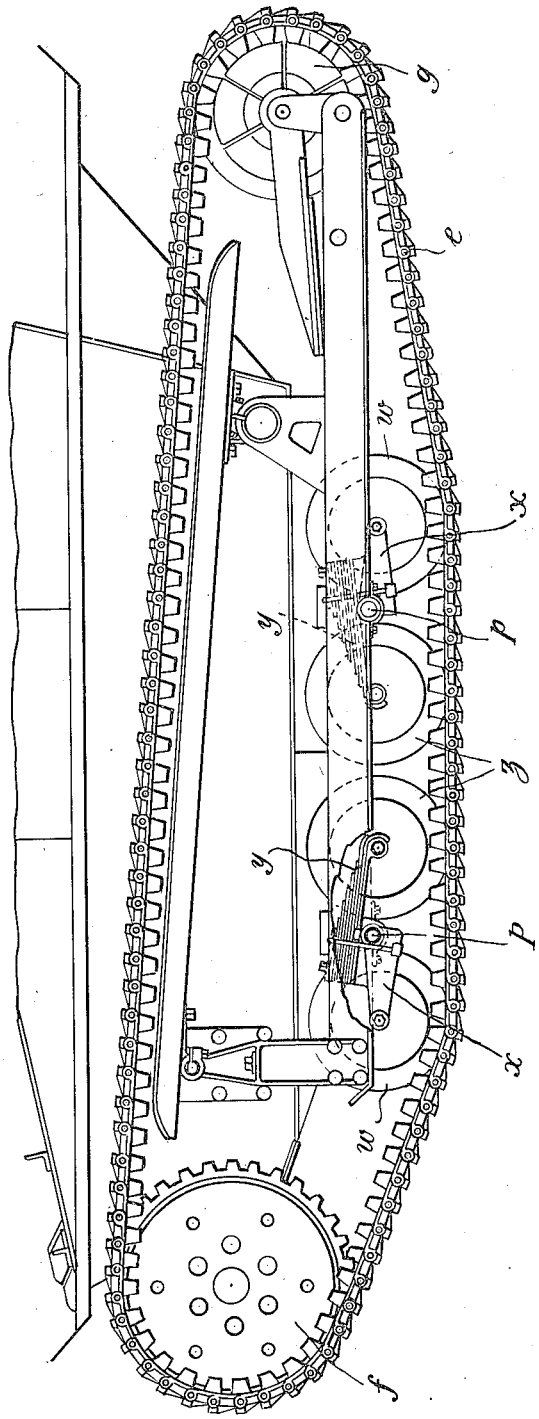

Patented Nov. 5, 1935

2,019,654

UNITED STATES PATENT OFFICE 2,019,654

ENDLESS TRACK VEHICLE

John Valentine Carden, Piccadilly, Westminster, England, assignor to Vickers-Armstrongs, Limited, Westminster, England, a British company Application July 20, 1929, Serial No. 379,854
In Great Britain August 24, 1928

9 Claims. (Cl. 305—9)

This invention relates to endless track vehicles of the kind in which rollers or wheels within the tracks for supporting the vehicle, or certain of them, are arranged in pairs and are carried by spring members which are mounted at their middle parts in such a manner as to be capable of angular or rocking movement about a horizontal axis during travel of the vehicle. The chief object of the present invention is to provide an improved spring suspension or mounting for the aforesaid supporting rollers or wheels.

According to the invention, one, or more, of the spring members is made up of a rigid part and a flexible part, and one of a pair of wheels or rollers is journalled in the rigid part and the other is journalled in the flexible part. The rigid part may comprise a forked radius member having a roller or wheel journalled in the outer ends of its arms and the flexible part may be made up of a pair of laminated springs the inner ends of which are bolted or otherwise secured to the inner ends of the radius member and in the outer ends of which the other roller or wheel is journalled. Such an arrangement is particularly suitable for constructions in which it is essential that the rollers, or certain of them, be kept very rigidly in position and side movement entirely eliminated or reduced to a minimum as, for instance, where the first and last rollers of the track are adapted to maintain the track in position relatively to an idler wheel or a sprocket wheel employed for driving the endless track.

In order that the said invention may be clearly understood and readily carried into effect the same will now be more fully described with reference to the accompanying drawings, in which:—

Figures 1 and 2 show in elevation and plan, respectively, one embodiment of the invention;

Figure 3 shows in elevation a modification of the arrangement illustrated in Figures 1 and 2;

Figure 4 is an end elevation of Figure 3, and

Figure 5 illustrates an elevation of a track-laying vehicle embodying the invention.

In Figures 1 and 2 the spring member is made up of a rigid part consisting of a forked radius member $x$ and a flexible part consisting of a pair of laminated springs $y$, all of the laminations of which are bolted by U-bolts $a$ and screwbolts $b$ or otherwise secured at their inner ends to the inner end of the radius member. The radius member is pivotally mounted at $p$ on the framework of the vehicle so that rocking or angular movement can take place during the travel of the vehicle and one wheel $w$ is journalled in the outer ends of the arms of the forked radius member while the other wheel $z$ is journalled in the outer ends of the laminated springs $y$. By this arrangement each wheel is sprung but the wheel $w$ which is carried between the arms of the radius member $x$ is prevented from flexing sideways.

In Figure 5, which illustrates the invention applied to a track-laying vehicle, two of the arrangements illustrated in Figures 1 and 2 support the body of the vehicle at each side and the radius members $x$ thereof are pivoted on shafts $p$ on the frame of the vehicle, so as to permit rocking or angular movements of the rollers or wheels $w$ and $z$ and of the composite members $x$—$y$ during travel of the vehicle. The endless track $e$ passes under and in engagement with the wheels or rollers $w$ and $z$, around a driving sprocket $f$ at the forward end of the vehicle, and around an idler sprocket $g$ at the rear end of the vehicle. In this arrangement the rollers or wheels $w$ and $z$ are kept rigidly in position and side movement is entirely eliminated or at least reduced to a minimum under the most severe operating conditions. This is particularly desirable for the first and last rollers $w$ of the track, which rollers maintain the position of the track relative to the idler and sprocket wheels $g$ and $f$, respectively, toward which the radius members $x$ of the corresponding roller or wheel sets are directed.

Figures 3 and 4 show a development or modification of the arrangement illustrated in Figures 1 and 2 in which there are two pairs ($w^1$, $w^2$, and $z^1$, $z^2$) of supporting wheels or rollers each of which is illustrated as a double wheel or roller. The elements of one pair ($w^1$, $w^2$) are journalled in the opposite ends of a pair of substantially horizontal arms $q$ which are pivotally mounted at their mid-points in the outer end of a radius arm $x^1$ and the elements of the other pair ($z^1$, $z^2$) are pivotally mounted in the opposite end of another pair of parallel and horizontally arranged arms $q^1$ which are pivotally mounted at their mid-points in the outer ends of a pair of parallel laminated springs $y^1$, the inner ends of which are bolted or otherwise secured to the inner end of the radius member. As in the arrangement illustrated in Figures 1 and 2 the radius member is adapted to be pivotally mounted at $p^1$ on the framework of the vehicle.

In the following claims the term "wheels" is intended to include "rollers".

What I claim and desire to secure by Letters Patent of the United States is:—

1. In a vehicle moved through the medium of endless tracks, two pairs of supporting wheels within each track, a composite spring member composed of a rigid radius element and a flexible part, said spring member being pivotally mounted at its middle part in the rigid element so as to be capable of rocking movement about a horizontal axis during travel of the vehicle, said flexible part being secured to the rigid element and terminating at a point between the free end of the rigid element and its pivot, one pair of said supporting wheels being journalled in the opposite ends of an arm which is pivotally mounted at its mid-point in the rigid radius element, the other pair of said wheels being journalled in the opposite ends of another arm which is pivotally mounted at its middle part in the outer end of said flexible part comprising a laminated spring the inner end of which is secured to the inner end of the radius element.

2. In a vehicle moved through the medium of endless tracks, end wheels for said tracks, one of said end wheels being a driving wheel for the tracks, pairs of wheels for normally supporting the vehicle located between said wheels and within the tracks, a composite spring member composed of a rigid part and a flexible part, said spring member being pivotally mounted at its middle part in the rigid part so as to be capable of rocking movement about a horizontal axis during normal travel of the vehicle, said rigid part comprising a forked radius member having a wheel journalled in the outer ends of its arms, said flexible part comprising a pair of laminated springs the inner ends of which are secured to the inner ends of the radius member and in the outer ends of which the other wheel is journalled.

3. In a vehicle, the combination of a frame, supporting wheels arranged in pairs, composite spring members each supporting a pair of said wheels at its ends, and a pivot connecting the member intermediate its ends to the frame to permit rocking movement about a horizontal axis during travel of the vehicle, said composite spring members each comprising a rigid part having the said pivot and a flexible part secured to the rigid part and terminating at a point between the free end of the rigid part and its pivot, said flexible part comprising a pair of spaced springs between which one wheel is located.

4. In a vehicle, the combination of a frame, a composite spring member, a pivot connecting the member substantially at its midpoint to the frame to permit rocking movement about a horizontal axis during travel of the vehicle, wheels carried by the ends of the member, said member comprising a rigid part including the said pivot, and a pair of laminated springs, the leaves of which terminate and are anchored on the rigid part between the pivot and the free end of the rigid part.

5. In a vehicle, the combination of a frame, a composite spring member, a pivot connecting the member substantially at its midpoint to the frame to permit rocking movement about a horizontal axis during travel of the vehicle, wheels carried by the ends of the member, said member comprising a rigid part including the said pivot, and a pair of laminated springs anchored on the rigid part and terminating at one end between the pivot and the free end of the rigid part, said rigid part being divided at its free end and the free ends of the springs being spaced apart to accommodate the corresponding wheels.

6. In a vehicle moved through the medium of endless tracks, the combination of a frame, a composite spring member on each side of the vehicle, each connected intermediate its ends to the frame by a pivot for rocking movement independently of the rocking movement of the opposite member, said composite spring member comprising oppositely extending rigid and flexible parts having at least one wheel on their free ends, the rigid part having said pivot and the flexible part being secured to the rigid part and terminating at its inner end between the pivot and the free end of the latter, and comprising spaced springs carrying wheels between them.

7. In a vehicle moved through the medium of endless tracks, end wheels for said tracks, one of said end wheels being a driving wheel for the tracks, pairs of wheels for normally supporting the vehicle located between said wheels and within the tracks, a composite spring member comprised of a rigid part and a flexible part, said spring member being pivotally mounted at its middle part in the rigid part so as to be capable of rocking movement about a horizontal axis during normal travel of the vehicle, said rigid part having at least one wheel mounted thereon and said flexible part comprising a pair of spaced springs secured at their inner ends to the inner end of the radius member and having at least one wheel mounted between their outer ends.

8. In a vehicle moved through the medium of endless tracks, the combination of a frame, a plurality of pairs of supporting wheels on the sides of the frame engaging the tracks, and a composite spring-member at each side of the frame pivoted intermediate its ends to the frame and carrying at least one of said pairs of wheels, said member comprising a rigid part carrying a wheel at its outer end and a flexible part secured to the rigid part, said flexible part comprising spaced springs carrying a wheel between their outer ends, the composite spring member at one side of the frame being capable of a rocking movement about its pivot independently of the rocking movement of the corresponding spring member at the opposite side of the frame.

9. In a vehicle moved through the medium of endless tracks, the combination of a frame, two pairs of supporting wheels on each side of the frame, engaging the tracks, and a composite member at each side of the frame pivoted intermediate its ends to the frame and carrying one of said pairs of wheels at each end, said member comprising a rigid part including the pivot and a flexible part secured thereto and terminating at a point between the pivot and the free end of the rigid part, said flexible part comprising spaced springs carrying wheels between them.

JOHN VALENTINE CARDEN.